United States Patent [19]

Pantzar

[11] Patent Number: 5,007,775
[45] Date of Patent: Apr. 16, 1991

[54] CUTTING INSERT FOR CHIP REMOVING MACHINING

[75] Inventor: Glenn G. E. Pantzar, Arsunda, Sweden

[73] Assignee: Sandvik AB, Sandviken, Sweden

[21] Appl. No.: 400,066

[22] Filed: Aug. 29, 1989

[30] Foreign Application Priority Data

Sep. 6, 1988 [SE] Sweden ................ 8803122

[51] Int. Cl.$^5$ .................................... B23C 5/02
[52] U.S. Cl. .................... 407/113; 407/115; 407/114
[58] Field of Search .......... 407/30, 34, 46, 63, 407/113, 114, 115

[56] References Cited

U.S. PATENT DOCUMENTS

| | | | |
|---|---|---|---|
| 3,781,956 | 1/1974 | Jones et al. ................ | 407/116 |
| 3,975,809 | 8/1976 | Sorice et al. ............... | 407/114 |
| 4,632,607 | 12/1986 | Pantzar ..................... | 407/113 |
| 4,681,488 | 7/1987 | Markusson ................ | 407/114 |

*Primary Examiner*—Frederick R. Schmidt
*Assistant Examiner*—Jack Lavinder
*Attorney, Agent, or Firm*—Burns, Doane, Swecker & Mathis

[57] ABSTRACT

A cutting insert for chip cutting machining, preferably for plane milling operations, has a generally square geometry and comprises a chip face and a number of clearance faces. A portion of the chip face is beveled and extends along a cutting edge from one cutting corner toward an adjacent cutting corner. The beveled portion is angularly oriented such that the insert obtains a more negative cutting geometry near the cutting corner than at a distance therefrom in order to achieve increased strength of the insert.

20 Claims, 3 Drawing Sheets

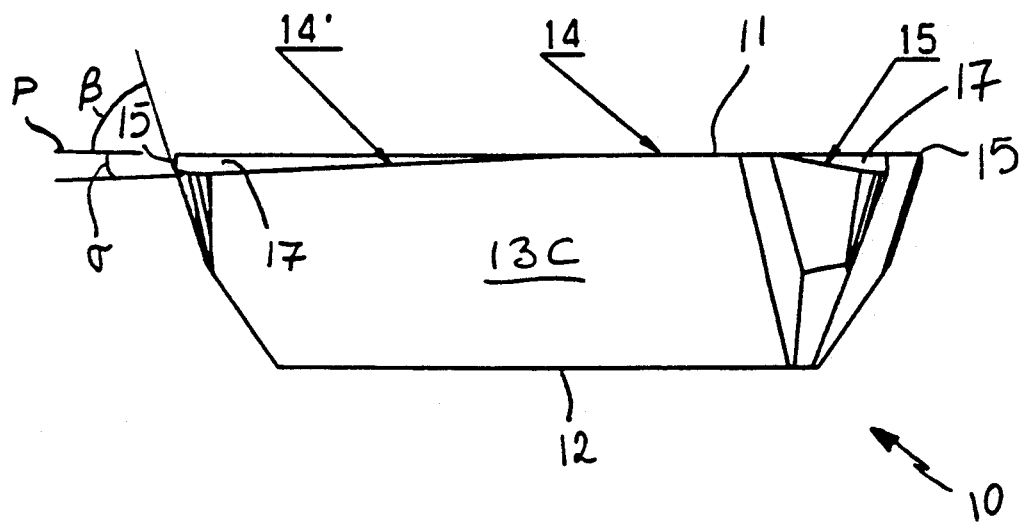
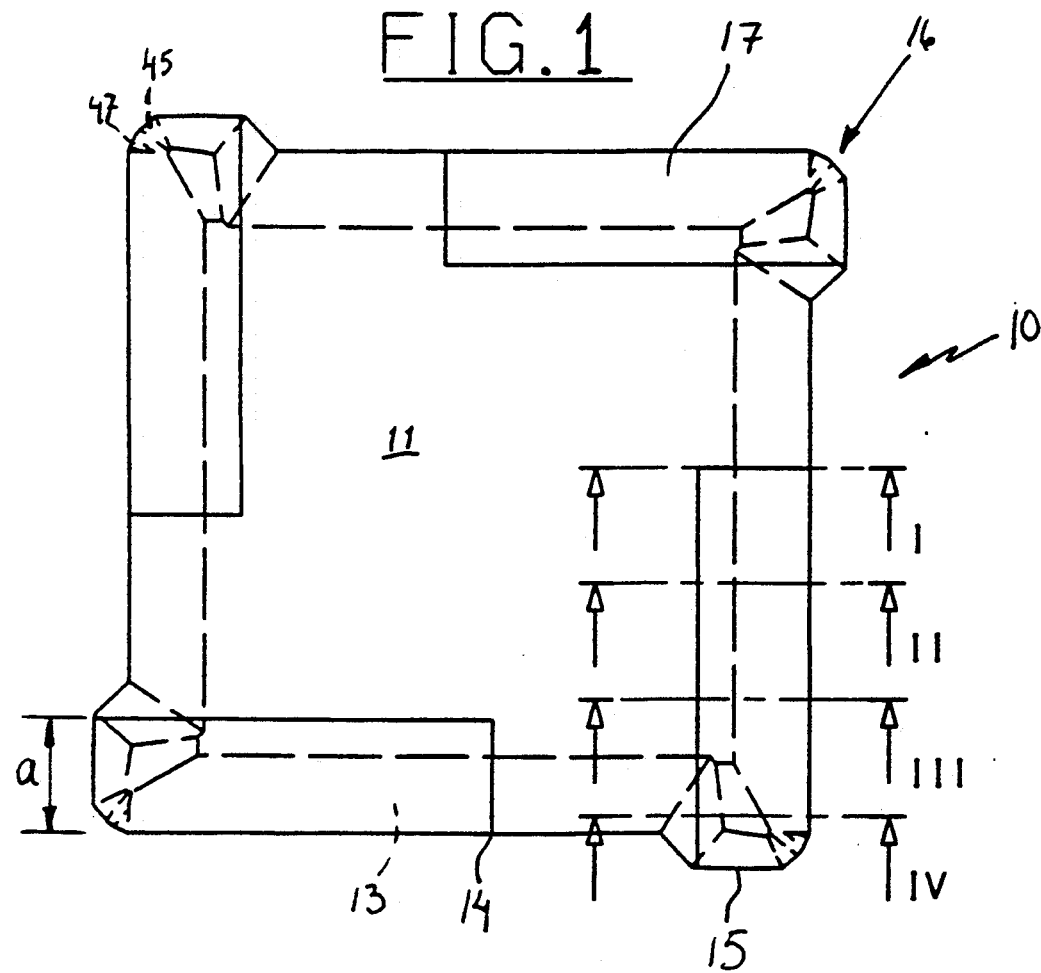

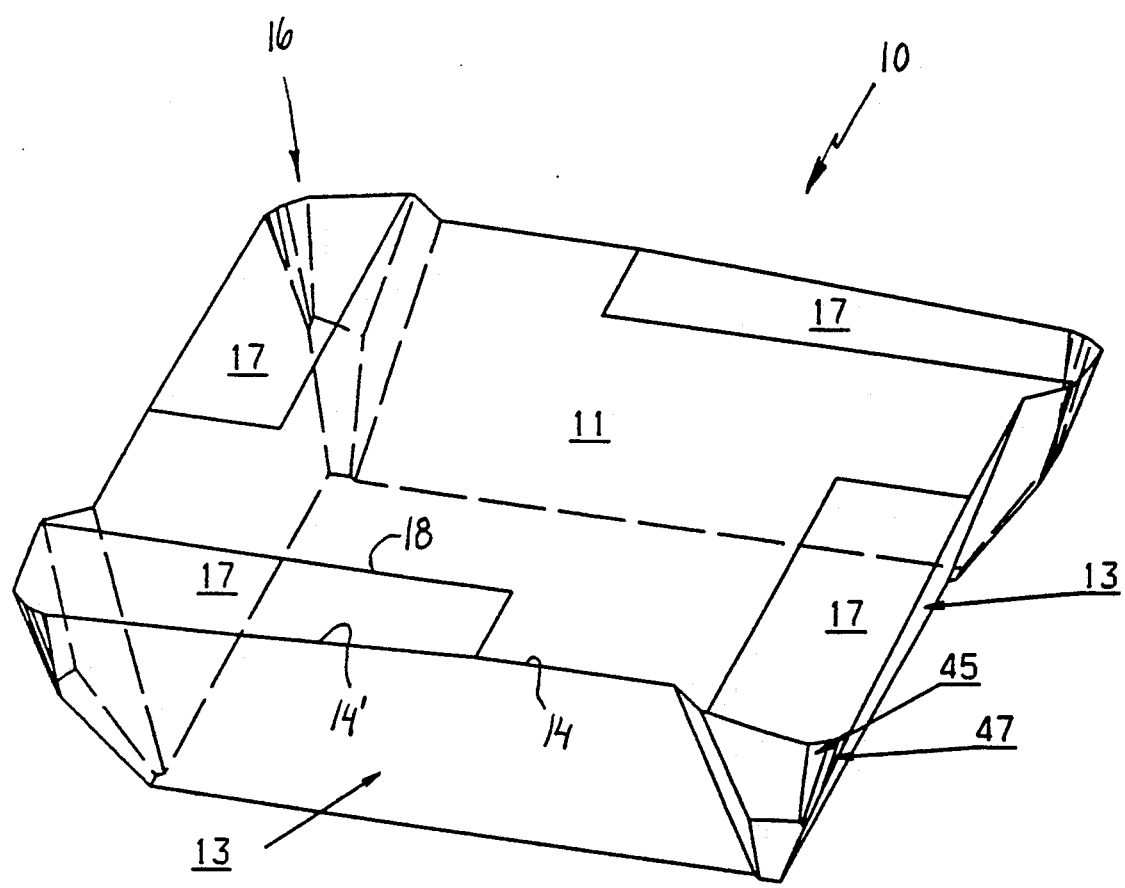

CUTTING INSERT FOR CHIP REMOVING MACHINING

BACKGROUND OF THE INVENTION

The present invention relates to a cutting insert for chip cutting machining, preferably for plane milling operations. The insert has a generally polygonal shape comprising a chip face and clearance faces, with two of the clearance faces intersecting each other in a cutting corner. The chip face is mainly oriented in one plane. The clearance faces are oriented such as to form an inner acute angle with the plane. The periphery of the insert is provided with cutting edges.

A prior art insert of the afore-mentioned type (e.g., see U.S. Pat. Nos. 4,632,607 and 4,681,488) comprises a planar chip face which is oriented at a relatively pronounced acute inner angle to the adjacent clearance face. When milling is carried out, that insert edge has incurred damage and undesirable wear.

It is a purpose of the present invention to provide a cutting insert having improved strength.

SUMMARY OF THE INVENTION

The present invention involves a cutting insert for chip cutting machining. The insert comprises a body of generally polygonal shape having a chip face, an opposite bottom face, and at least one clearance face intersecting the chip face to define a cutting edge which extends to a corner of the body. A portion of the chip face extending along the cutting edge is beveled such that a first angle of inclination disposed at a first location adjacent the corner and formed by the intersection of the beveled portion and a mid-plane disposed intermediate the chip face and the bottom face is larger than a second angle of inclination formed by the intersection of the beveled portion and the midplane at a second location situated farther from the corner than the first location.

Preferably, the angle of inclination increases continuously as the corner is approached.

Preferably, a first edge angle is formed between the beveled portion and the clearance face at the first location is larger than a second edge angle formed between the beveled portion and the clearance face at the second location.

Most preferably, the edge angle increases continuously as the corner is approached. It is preferred that each edge angle is at least 60 degrees and less than 90 degrees.

BRIEF DESCRIPTION OF THE DRAWING

The objects and advantages of the invention will become apparent from the following detailed description of a preferred embodiment thereof in connection with the accompanying drawings in which like numerals designate like elements, and in which:

FIG. 1 is a plan view of an insert according to the invention;

FIG. 2 is a side view of the insert shown in FIG. 1;

FIG. 3 is a top perspective view of the insert shown in FIG. 1.; and

DETAILED DESCRIPTION OF A PREFERRED EMBODIMENT OF THE INVENTION

Figure 4:
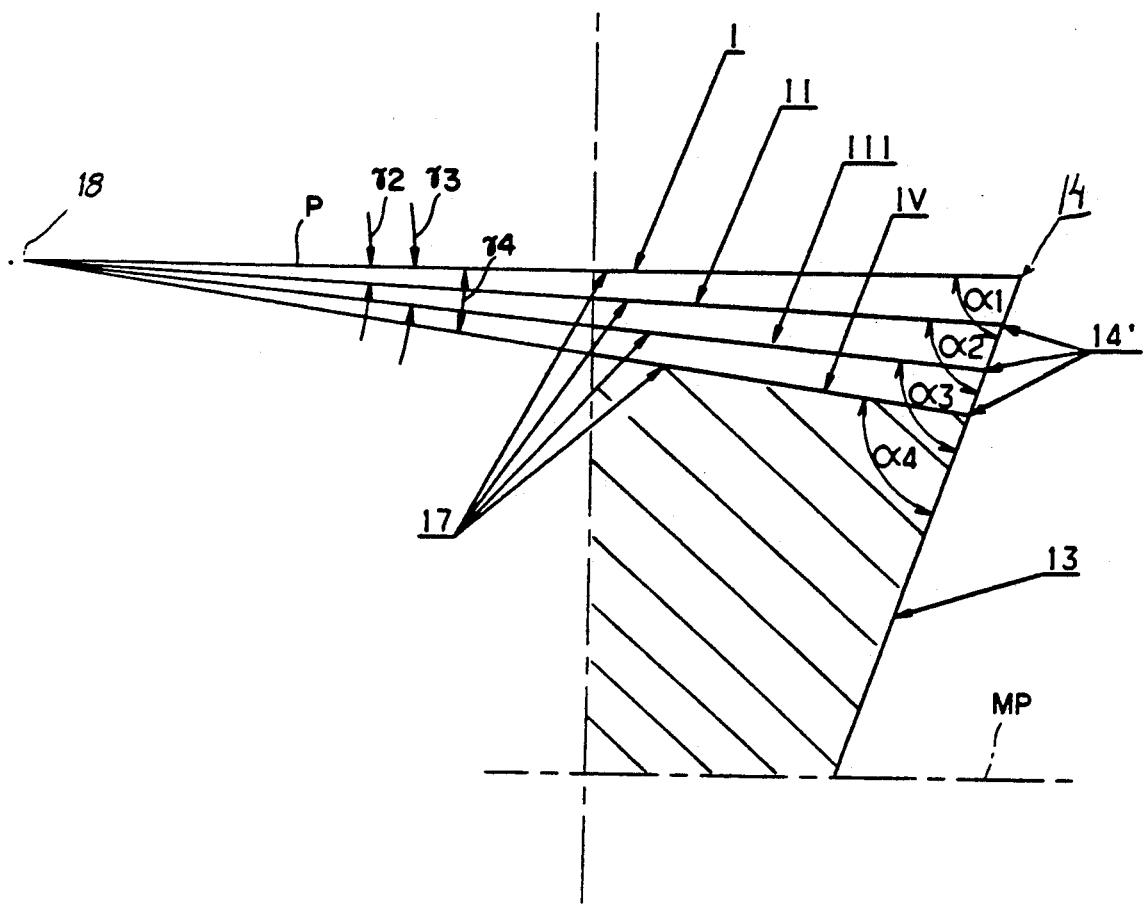
FIG. 4 schematically shows four cross-sections taken along the lines I to IV in FIG. 1.

The insert shown in FIGS. 1–4 is an indexable insert 10 which has a generally square shape comprising a top surface 11 intended to be a chip face and a bottom surface 12, each surface being parallel and joined by clearance or edge surfaces 13. Each of the edge surfaces is oriented at an acute angle $\beta$ relative to a plane P defined by the top surface. Main cutting edges 14 and secondary cutting edges 15 are arranged at the periphery of the top surface 11. The main cutting edges 14 are arranged along an imaginary square and the secondary cutting edges 15 extend outside of the square shape. The secondary edge 15 extends a distance a mainly perpendicularly in relation to its adjacent main cutting edge. The main cutting edges are intended to remove by chip machining the major portion of the workpiece whereas the secondary edges are intended to generate the surface of the workpiece. The provision of these cutting edges 14 and 15 are described in detail in U.S. Pat. No. 4,632,607, the disclosure of which is incorporated herein.

At each corner 16 of the insert the chip face includes a beveled portion. Those four beveled portions are identical; thus, only one is described hereinafter. A beveled face portion 17 extends from an associated secondary edge 15 along at least half the extension of the associated main cutting edge 14. The width of the beveled face portion 17 measured perpendicularly in relation to the adjacent main cutting edge corresponds with the length a of the adjacent secondary cutting edge 15. The width of the beveled face portion 17 should be between 0.1 and 4.0 mm, preferably about 3 mm.

A portion 14' of the cutting edge lying on the beveled face portion 17 is oriented at an angle $\sigma$ of 1°–10°, preferably 3°–6°, in relation to the plane P. The straight inner limitation or border of the beveled face portion 17 is formed by a line 18 that is oriented in the plane P and extends mainly parallel with the edge portion 14' as viewed in plan; (see FIG. 1). The beveled face portions 17 are separated from one another. The beveling of the face portions 17, which is achieved by a grinding and sintering of the chip face 11, creates a continuously changing edge angle $\alpha$ formed by the beveled face portion 17 and the associated clearance surface 13 (see FIG. 4). The edge angle $\alpha$ increases in size in a direction towards the cutting corner 16, i.e., the edge angle becomes larger as the corner is approached. In FIG. 4 a schematic cross-section of the insert is shown to depict the varying size of the edge angle. As a general rule the edge angle $\alpha$ is allowed to vary in the range from 60° up to a value less than 90°, i.e., $90° > \alpha \geq 60°$, preferably between 80 and 70 degrees.

A cross-section taken along the line I is taken at a position outside of the beveled face portion but close to an adjacent cutting corner whereby the edge angle $\alpha 1$, between the plane P of the top surface and the clearance surface 13 is about 70°. In the cross-section taken through the face portion along the line II located at a position somewhat closer to the adjacent cutting corner the edge angle $\alpha 2$ is about 73°. In sections taken along the lines III and IV which are located somewhat closer to the respective adjacent corner the edge angles $\alpha 3$ and $\alpha 4$ are 76° and 80°, respectively. The beveled face portion 17 is straight in each of these cross-sections whereby each straight portion intersects with the limitation line 18. Since the edge angle $\alpha$ is continuously changed along the cutting edge portion 14', the angles of inclination γ2-γ4 which the beveled face 17 forms with the plane P become progressively larger as the corner is approached (see FIG. 4), such that the insert 10, as seen in a direction from the cutting corners 16, obtains a successively smaller negative cutting angle when the insert is mounted in a milling cutter body. This means that the insert is strengthened at its weakest area, namely at the cutting corner. In a direction away from the corner, the insert becomes gradually inherently stronger while the strengthening effect caused by the varying edge angle is reduced. The condition wherein the inclination angle γ2-γ4 changes as the corner is approached is preferably attained by changing the edge angle α as noted above. Note that the changing of the inclination angle could be attained even if the edge angle α were caused to remain constant, by changing the inclination of the clearance surface 13 as the corner is approached. However, it is preferred to vary the angle of inclination by varying the edge angle.

Note that the angles of inclination γ2-γ4 are depicted as being formed between the beveled face portion 17 and the plane P. Those same angles are also formed between the beveled face portion 17 and a midplane MP of the insert which lies intermediate the top and bottom surfaces 11, 12, since the plane P and the midplane MP are parallel in the preferred embodiment.

When using a cutting insert of the type described in U.S. Pat. No. 4,632,607, where protruding cutting portions are provided, it is especially beneficial to strengthen the corners of the inserts by providing beveled face portions in accordance with the present invention. The invention, however, is not limited to the above-related type of inserts but can be used advantageously with most conventional inserts having a regular polygonal basic shape, as well as with inserts which do not have protruding secondary cutting edges.

Although the present invention has been described in connection with a preferred embodiment thereof, it will be appreciated by those skilled in the art that additions, modifications, substitutions, and deletions not specifically described, may be made without departing from the spirit and scope of the invention as defined in the appended claims.

What is claimed is:

1. A cutting insert for chip cutting machining comprising a body of generally polygonal shape having a chip face, an opposite bottom face and at least one clearance face intersecting said chip face to define a cutting edge which extends to a corner of said body, a portion of said chip face extending along said cutting edge beveled in a direction linearly inclined toward and intersecting said cutting edge and simultaneously toward a midplane of said insert disposed intermediate said chip face and said bottom face such that a first angle of inclination disposed at a first location adjacent said corner and formed by the intersection of said beveled portion and said midplane is larger than a second angle of inclination formed by the intersection of said beveled portion and said midplane at a second location situated farther from said corner than said first location.

2. Cutting insert according to claim 1, wherein said angle of inclination increases continuously as said beveled portion approaches said corner.

3. Cutting insert according to claim 1, wherein a first edge angle formed between said beveled portion and said clearance face at said first location is larger than a second edge angle formed between said beveled portion and said clearance face at said second location.

4. Cutting insert according to claim 3, wherein the edge angle formed between said beveled portion and said clearance face increases continuously as said beveled portion approaches said corner.

5. Cutting insert according to claim 4, wherein said corner is defined by the intersection of said first-named cutting edge and a secondary cutting edge which has a length of about half the length of said first-named cutting edge.

6. Cutting insert according to claim 5, wherein a non-beveled portion of said chip face defines a plane, a portion of said cutting edge lying on said beveled portion forming an acute angle with said plane, a line of intersection between said beveled and non-beveled portions lying in said plane.

7. Cutting insert according to claim 6, wherein said beveled portion has a width extending perpendicular to said first-named cutting edge, which width corresponds to the length of said secondary cutting edge.

8. Cutting insert according to claim 7, wherein said width is from about 0.1 to 4.0 mm.

9. Cutting insert according to claim 8, wherein said width is about 3 mm.

10. Cutting insert according to claim 3, wherein said angle is at least sixty degrees and less than ninety degrees.

11. Cutting insert according to claim 3, wherein said angle is at least seventy degrees and no greater than eighty degrees.

12. Cutting insert according to claim 1, wherein said insert has a plurality of corners, with a cutting edge and beveled portion being associated with each of said corners.

13. Cutting insert according to claim 12, wherein each of said beveled portions extends for only a portion of a length of the associated cutting edge.

14. Cutting insert according to claim 12, wherein said plurality of corners comprises four corners.

15. Cutting insert according to claim 14, wherein each said corner is formed by the intersection of said first-named cutting edge and a secondary cutting edge, said first-named cutting edges and imaginary extensions thereof intersecting to form a rectangle, said secondary cutting edges situated outside of said rectangle.

16. Cutting insert according to claim 15, wherein each of said secondary cutting edges includes two mutually angled cutting edge portions located at the respective corner.

17. A cutting insert according to claim 1, wherein said beveled portion intersects said cutting edge.

18. A cutting insert for chip cutting machining comprising a body of generally polygonal shape having a chip face, an opposite bottom face, and at least one clearance face intersecting said chip face to define a cutting edge which extends to a corner of said body, a portion of said chip face beveled in a direction linearly inclined toward and intersecting said cutting edge and simultaneously toward a midplane of said insert disposed intermediate said chip face and said bottom face such that a first edge angle formed between said beveled portion and said clearance face at a first location adjacent said corner is larger than a second edge angle formed between said beveled portion and said clearance face at a second location situated farther from said corner than said first location.

19. A cutting insert according to claim 18, wherein said edge angle continuously increases as said beveled portion approaches said corner.

20. A cutting insert according to claim 18, wherein said beveled portion intersects said cutting edge.

* * * * *